United States Patent [19]
Pettit, Jr.

[11] 3,846,368
[45] Nov. 5, 1974

[54] THERMOSETTING ACRYLIC POWDER COATING COMPOSITION OF A POLYBLEND OF ACRYLIC POLYMER HAVING A HIGH GLASS TRANSITION TEMPERATURE AND AN ACRYLIC POLYMER HAVING A LOW GLASS TRANSITION TEMPERATURE AND A CROSS-LINKING AGENT

[75] Inventor: Paul H. Pettit, Jr., Wilmington, Del.
[73] Assignee: E. I. du Pont de Nemours and Company, Wilmington, Del.
[22] Filed: Apr. 19, 1973
[21] Appl. No.: 352,738

[52] U.S. Cl. ............. 260/39 R, 117/132 A, 260/15, 260/21, 260/31.2 N, 260/32.8 N, 260/33.2 R, 260/33.4 R, 260/33.6 UA, 260/39 P, 260/39 M, 260/39 SB, 260/834, 260/836, 260/851, 260/856, 260/873
[51] Int. Cl.... C08g 37/32, C08g 45/10, C08g 51/14
[58] Field of Search.......... 260/851, 856, 834, 39 R, 260/39 P, 39 M, 39 BB; 117/132 A

[56] References Cited
UNITED STATES PATENTS
3,773,710   11/1973   Victorius ........................... 260/856

Primary Examiner—Paul Lieberman
Assistant Examiner—J. Ziegler

[57] ABSTRACT

The thermosetting acrylic polymer powder coating composition comprises finely divided particles that have a diameter of 1–100 microns wherein the powder particles are a blend of A. a hard acrylic polymer of methyl methacrylate, an alkyl methacrylate or an alkyl acrylate having 2–14 carbon atoms in the alkyl groups, a hydroxyalkyl acrylate or a hydroxyalkyl methacrylate that have 2–4 carbon atoms in the alkyl groups; the acrylic polymer has a number average molecular weight of 3,000–10,000 and glass transition temperature of about 75° to 90°C.;

B. a soft acrylic polymer of methyl methacrylate, the above alkyl acrylate or methacrylate and either a hydroxyl alkyl acrylate or a hydroxyalkyl methacrylate; this acrylic polymer has a number average molecular weight of 8,000–20,000 and a glass transition temperature of about 0° to 30°C.;

C. an alkylated melamine formaldehyde resin;
D. a dihydroxy functional plasticizer; and
E. a blocked acid catalyst;
the novel thermosetting acrylic powder coating composition is particularly useful as an exterior finish for automobile and truck bodies.

10 Claims, No Drawings

THERMOSETTING ACRYLIC POWDER COATING COMPOSITION OF A POLYBLEND OF ACRYLIC POLYMER HAVING A HIGH GLASS TRANSITION TEMPERATURE AND AN ACRYLIC POLYMER HAVING A LOW GLASS TRANSITION TEMPERATURE AND A CROSS-LINKING AGENT

BACKGROUND OF THE INVENTION

This invention is related to powder coating compositions and in particular, to a thermosetting acrylic polymer powder coating composition.

Thermosetting powder coating compositions of epoxy resins are well known in the art as shown in Elbling U.S. Pat. No. 3,039,987, issued June 19, 1962 and Winthrop et al. U.S. Pat. No. 3,102,043, issued Aug. 27, 1963. Thermosetting powder coating compositions of an epoxy resin, a polyvinyl acetal resin and a polyacrylate resin are disclosed in Flowers et al. U.S. Pat. No. 3,058,951, issued Oct. 16, 1962. In general, the epoxy powder coatings have poor outdoor durability making these coatings unacceptable for exterior use on automobile and truck bodies. The thermosetting acrylic powders heretofore known in the art in general have a poor appearance caused by inadequate flow of the finish during baking and often the finish contains small craters caused by popping during the baking cycle. These defects made the compositions unacceptable for an exterior finish for automobile and truck bodies.

To curb pollution caused by conventional solvent based coating systems, the automobile and truck manufacturing industry intends to utilize powder coating compositions. However, the industry demands that these powder coating compositions be of a high quality. The novel thermosetting acrylic polymer powder coating composition of this invention has a sufficiently high glass transition temperature to maintain a free-flowing powder and has sufficiently low melt viscosity to flow to an exceptionally smooth glossy finish. The finish is of a high quality and has an appearance and good physical properties as is required for the exterior finishes of automobile and truck bodies.

SUMMARY OF THE INVENTION

The thermosetting acrylic polymer powder coating composition of this invention comprises finely divided particles that have a particle size of 1-100 microns; the powder particles are an intimate blend of the following constituents:

A. 40-75 percent by weight of a hard acrylic polymer of
  1. 80-95 percent by weight of methyl methacrylate,
  2. 3-10 percent of an alkyl acrylate or an alkyl methacrylate having 2-14 carbon atoms in the alkyl groups,
  3. 2-17 percent by weight of a hydroxyalkyl acrylate or a hydroxyalkyl methacrylate that have 2-4 carbon atoms in the alkyl groups or mixtures thereof;

wherein the hard acrylic polymer has a glass transition temperature of about 75° to 90°C. and a number average molecular weight 3,000-10,000;

B. 10-25 percent by weight of a soft acrylic polymer of
  1. 40-60 percent of methyl methacrylate;
  2. 30-56 percent of an alkyl acrylate or an alkyl methacrylate having 2-14 carbon atoms in the alkyl groups; and
  3. 4-10 percent by weight of a hydroxylalkyl methacrylate or a hydroxyalkyl acrylate having 2-4 carbon atoms in the alkyl groups or mixtures thereof;

wherein the soft acrylic polymer has a glass transition temperature of about 0° to 30°C. and a number average molecular weight of about 8,000-20,000

C. 7-19.98 percent by weight of an alkylated melamine formaldehyde resin having 1-8 carbon atoms in the alkyl group;

D. 6-15 percent by weight of a dihydroxy functional plasticizer; and

E. 0.02-2.0 percent by weight of a blocked acid catalyst.

DESCRIPTION OF THE INVENTION

The novel thermosetting acrylic powder coating composition of this invention has powder particles that preferably are 10 to 75 microns in diameter.

The powder particles can be pigmented or unpigmented but usually contain about 0.2-50 percent by weight of pigment. Any of the conventional inorganic pigments, organic dyes, organic pigments, and lakes can be used. The hard acrylic polymer and the soft acrylic polymer are chosen so that there is borderline incompatibility between the polymers. This is readily observed in an electron micrograph of an unpigmented coalesced cured or uncured film of the powder wherein discrete areas of soft acrylic polymer are noted in the hard acrylic polymer film. If the polymers are completely incompatible, a stable powder cannot be formed and the film properties of the powder are poor. If the polymers are completely compatible, the powder will have good flow on baking, but the powder will be sticky and tacky and will be unstable and cake after a short period of time.

About 40-75 percent by weight, based on the weight of the film-forming constituents in the powder coating composition, of the hard acrylic polymer is utilized and preferably about 55-65 percent by weight of the acrylic polymer is used. Also, blends of the hard acrylic polymer can be used. The hard acrylic polymer has a weight average molecular weight of about 6,000 to 20,000, preferably 8,000 to 12,000, a number average molecular weight of about 3,000 to 10,000, and preferably 4,000-7,000 and a glass transition temperature of 75° to 90°C.

The novel powder contains about 10-25 percent by weight, based on the weight of the film-forming constituents, of a soft acrylic polymer and preferably contains about 12-18 percent by weight of the soft acrylic polymer. The soft acrylic polymer has a number average molecular weight of about 8,000-20,000 and preferably, 9,000-17,000, a weight average molecular weight of 16,000 to 50,000, and preferably, 20,000 to 30,000 and a glass transition temperature of 0° to 30°C.

Both the number and weight average molecular weight of the acrylic polymers are determined by gel permeation in chromotography using polymethyl methacrylate as the standard.

Both the hard and the soft acrylic polymers are prepared by conventional solution, emulsion or bead polymerization techniques and by using conventional polymerization catalysts.

The acrylic polymers can be prepared by conventional solution polymerization techniques in which the monomer constituents are blended with solvents and a polymerization catalyst and the reaction mixture is heated to 55°–150°C. for about 2–6 hours to form a polymer that has the aforementioned number average molecular weight.

Typical solvents which are used to prepare the acrylic polymers are toluene, ethyl acetate, acetone, methylisobutyl ketone, methylethyl ketone, ethyl alcohol, and other aliphatic, cycloaliphatic and aromatic hydrocarbons, esters, ethers, ketones, and alcohols, such as are conventionally used. Solvents having a boiling point below 100°C. are preferred to facilitate spray drying of the composition or solvent removal by vacuum extrusion to form the novel powder coating composition.

About 0.1–4 percent by weight, based on the weight of the monomers, of a polymerization catalyst is used to prepare the acrylic polymers. Typical catalysts are azo-bis ($\alpha$, gamma-dimethyl-valeronitrile), benzoyl peroxide, t-butyl peroxy pivalate, azobisisobutyronitrile and the like. Up to about 5 percent by weight of a chain transfer agent can be used to control the molecular weight such as dodecyl mercaptan or mercapto ethanol which is preferred. In any case, a sufficient amount of a hydroxyl containing chain transfer agent such as mercapto ethanol is used to provide the acrylic polymer with terminal hydroxyl groups.

The acrylic polymers can be prepared by an emulsion polymerization process in which the monomers and an aqueous solution of a free radical catalyst are simultaneously and continuously fed into a polymerization vessel containing water, and a suitable emulsifying agent. The polymerization is carried out in a vessel equipped with a reflux condenser, preferably, under a inert atmosphere, utilizing polymerization temperatures of about 20°–90°C. Typical free radical catalysts that can be used are as follows: potassium persulphate, water-soluble peroxides, such as hydrogen peroxide. A redox type catalyst, such as a mixture of ammonium persulfate and sodium bisulfite, is preferred. If a redox catalyst is used, 0.1–5 parts per million of iron, based on the weight of water, in the form of a soluble iron salt such as ferrous sulfate should be added to the reaction mixture. Any active anionic or nonionic surfactant or combination thereof can be used as an emulsifying agent. An ammonium or volatile amine salt of a sulfated or sulfonated surfactant, such as ammonium lauryl sulfate, is preferred.

The acrylic polymer can also be prepared by suspension or bead polymerization techniques as disclosed in W. R. Sorenson and T. W. Campbell, *Preparative Methods of Polymer Chemistry*, Interscience Publishers, New York, 2nd Ed. 1968, page 254.

The hard acrylic polymer utilized in the novel powder coating composition of this invention contains about 85–95 percent by weight of methyl methacrylate, 3–10 percent by weight of an alkyl methacrylate or an alkyl acrylate having 2–14 carbon atoms in the alkyl groups and 2–17 percent by weight of a hydroxy alkyl methacrylate or a hydroxy alkyl acrylate each having 2–4 carbon atoms in the alkyl groups or mixtures thereof. One preferred hard acrylic polymer contains 85–90 percent by weight of methyl methacrylate, 2–5 percent by weight of lauryl methacrylate, 2–4 percent by weight of hydroxyethyl acrylate and 3–6 percent by weight of hydroxypropyl methacrylate.

One particularly useful hard acrylic polymer contains methyl methacrylate, lauryl methacrylate, hydroxyethyl acrylate, hydroxypropyl methacrylate in a weight ratio of 89.5/3.1/3.0/4.4.

The soft acrylic used in the novel powder coating composition contains 40–60 percent by weight of methyl methacrylate, 30–56 percent by weight of an alkyl acrylate or an alkyl methacrylate and 4–10 percent by weight of a hydroxy alkyl acrylate or a hydroxy alkyl methacrylate, having 2–4 carbon atoms in the alkyl groups. One preferred soft acrylic polymer contains 45–55 percent by weight of methyl methacrylate, 40–45 percent by weight of butyl acrylate, and 5–10 percent by weight of hydroxyethyl acrylate.

One particularly useful soft acrylic polymer contains methyl methacrylate, butyl acrylate and hydroxy ethyl acrylate in a weight ratio of 51/43/6.

Typical alkyl acrylates and alkyl methacrylates having 2–14 carbon atoms in the alkyl groups that can be used to prepare the acrylic polymers are as follows: ethyl acrylate, jporpyl acrylate, butyl acrylate, hexyl acrylate, 2-ethylhexyl acrylate, nonyl acrylate, decyl acrylate, lauryl acrylate, tetraadecyl acrylate, ethyl methacrylate, propyl methacrylate, gutyl methacrylate, isobutyl methacrylate, hexyl methacrylate, 2-ethylhexyl methacrylate, nonyl methacrylate, decyl methacrylate, lauryl methacrylate and tetradecyl methacrylate.

Typical hydroxy alkyl acrylates and methacrylates which can be used to prepare the acrylic polymer are 2-hydroxyethyl acrylate, 2-hydroxypropyl acrylate, 2-hydroxybutyl acrylate, 2-hydroxyethyl propyl 2-hydroxypropyl methacrylate, 2-hydroxybutyl methacrylate, and the like. 2-Hydroxyethyl acrylate tetradecyl 2-hydroxypropyl methacrylate are butyl The novel powder coating composition of this invention can contain up to 15 percent by weight of cellulose acetate butyrate. The cellulose acetate butyrate has a viscosity of 0.02–2 seconds measured according to ASTM–D-1343-56 at 25°C. and has butyryl content of about 30–60 percent by weight. Preferably the cellulose acetate butyrate has a viscosity of 0.02–0.1 second and butyryl content of 50–60 percent. The cellulose acetate butyrate provides an excellent appearance to the finish prepared from the novel powder coating composition and also provides a slight amount of reflow to the finish and allows the finish to be sanded and rebaked after an initial prebake at about 135°C. or below.

About 7–19.88 percent by weight, based on the weight of the film-forming constituents of the novel powder coating composition, of an alkylated melamine formaldehyde resin having 1–8 carbon atoms in the alkyl group is used. These alkylated melamine resins are those that are well known in the art and are prepared by conventional techniques in which a lower alkyl alcohol such as methanol, ethanol, butanol, isobutanol, propanol, isopropanol, and the like, is reacted with the melamine formaldehyde to provide pendent alkoxy groups. One particularly preferred melamine used in this invention because of its stability in the powder and since it forms a high quality coating is hexa(methoxymethyl) melamine "Cymel" 300 and 303 are highly preferred hexa(methoxymethyl) melamine resins that are used to form the novel powder coating composition of this invention and providing a finish with an excellent appearance. Preferably, 7–14 percent by weight based on the weight of the film-forming constituents of the powder coating composition of hexa(methoxymethyl) melamine resin is used.

The novel powder coating composition of this invention contains about 6–15 percent by weight and preferably 8–12 percent by weight of a dihydroxy functional plasticizer. These plasticizers are cross-linked with the other constituents in the novel powder coating composition and provide a high quality film. The typical hydroxyl terminated polyesters that can be utilized have a weight average molecular weight of about 520–4,000 and are as follows: adipic acid/butanediol/ethylene glycol; phthalic anhydride/butanediol/ethylene glycol; and adipic acid/neopentyl glycol/ethylene glycol and adipic acid/neopentyl glycol.

Hydroxyl terminated polycaprolactones can also be used as the plasticizer. These polycaprolacetones have a molecular weight in the range of 520–2,000. One preferred polycaprolactone has a molecular weight of 1,100–1,400 and more preferably, a molecular weight of about 1,250.

About 0–6 percent of other non-reactive monomeric and polymeric plasticizers can be used in the novel powder coating composition of this invention. Phthalate ester plasticizers in particular the alkyl and cycloalkyl ester phthalates in which the alkyl group has 2–10 carbon atoms can be used such as diethyl phthalate, dibutyl phthalate, didecyl phthalate, butylbenzyl phthalate, dicyclohexyl phthalate, and mixtures thereof. Other esters such as diethyl adipate and sucrose benzoate can also be used.

Non-reactive polyester resins can also be used as plasticizers. Typical polyesters are, for example, alkylene glycol esters of adipic and benzoic acid such as ethylene glycol adipate benzoate, neopentyl glycol adipate benzoate, ethylene glycol adipate benzoate phthalate and the like. Plasticizers of oil free or oil modified alkyd resins and polyesters and epoxidized soya bean oil can also be used.

Mixtures of the above polymeric plasticizers and monomeric plasticizers can be used such as a mixture of ethylene glycol adipate benzoate and diethyl phthalate, neopentyl glycol adipate benzoate and dibutyl phthalate and the like.

About 0.02–2.0 percent by weight of a blocked acid catalyst is utilized in the novel powder coating composition of this invention. Any composition can be used which will yield free acid groups to catalyze the reaction when the powder coating composition is baked. Preferably, about 0.02–1 percent by weight of a blocked paratoluene sulfonic acid is used. In particular, a paratoluene sulfonic acid blocked with a low molecular weight epoxy resin of the formula One preferred Epoxy resin of this type is "Epon" 812.

A silicone resin can be added to the novel powder coating composition of this invention to enhance flow and reduce cratering. Any of the conventional silicone resins or oils in amounts of 0.01–2 percent by weight can be used for this purpose.

Generally pigments are used in a powder coating composition of this invention in amounts of 0.2–50 percent by weight of the powder particles. Examples of the great variety of pigments which can be used in the novel powder coating composition of this invention are metallic oxide, preferably titanium dioxide, zinc oxide, iron oxide, and the like, metallic flake, such as aluminum flake, metallic powders, metal hydroxides, "Afflair" pigments, for example, mica flake coated with titanium dioxide, sulfides, sulfates, carbonates, carbon black, silica, talc, china, clay, and other extender pigments, organic dyes and lakes.

Preparation of the Novel Powder Coating Composition

To prepare the novel powder coating composition of this invention, the acrylic polymer solutions or emulsions are blended with the alkylated melamine formaldehyde resin, the dihydroxy functional plastiizers and optionally any other plasticizers and the blocked acid catalyst along with pigments, pigment dispersions and other additives such as the aforementioned silicone resin and the like.

The pigment dispersions utilized in powder coating composition of this invention are prepared by conventional techniques such as sand grinding, pebble milling, ball milling and the like of the acrylic polymer solution or dispersion with the above pigments.

Another method for preparing a pigment dispersion is a two-roll mill. It is used to prepare pigment chips which are then formed into a pigment dispersion. Generally, the pigments and one of the acrylic polymers along with volatile non-solvents for the polymer and plasticizer blended together and then the mixture is placed on a two-roll mill and the mixture is throughly milled to disperse the pigments in the vehicle and form pigment chips. These chips are then blended with a solvent to form a pigment dispersion which is utilized as indicated above.

One method for forming a powder composition from the above prepared mixture is to charge the mixture into a vacuum extruder or mixer which flashes off the solvent or water and leaves a solid material which is then ground into powder particles. The powder is then passed through a sieve with openings of about 100 microns, and preferably, 53 microns, to remove large particles.

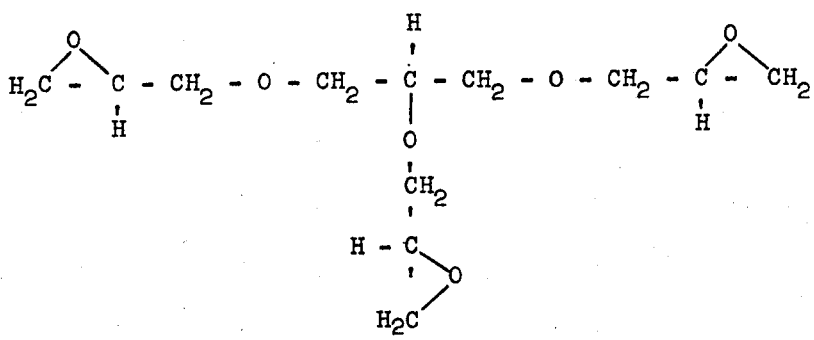

In another technique, the above prepared mixture can be charged into a vacuum extruder or mixer. The extruder is operated under a vacuum of about 22–25 inches of mercury, and a temperature of about 60° to 90°C. and the solvent or water is removed from the composition and a 100 percent dried product or extrudate is produced. The extrudate or dried product is then reduced to a powder using conventional grinding equipment, for example, a pin disc mill, a fluid energy mill or a hammer mill can be used. After grinding, the powder is passed through a sieve to remove large particles. Usually, a 270 mesh sieve (53 micron size) is used.

A two-roll mill is another technique that can be used to prepare the powder composition. The pigment chips or pigment dispersion, the acrylic polymer dispersion or solution, alkylated melamine formaldehyde resin, plasticizer, blocked acid catalyst and the other additives are charged into a two roll mill and milled together. The resulting composition is then ground to form the novel powder coating composition.

Optionally, about 0.1–2.0 percent by weight of finely divided silica or silane treated silica can be blended with the novel powder coating composition of this invention to eliminate caking of the powder and improve its handling and spraying properties.

Application of the Powder Novel Powder Coating Composition

The novel powder coating composition of this invention is then applied to a metal, glass, plastic or fiber reinforced plastic substrate by electrostatic spraying techniques or by using a fluidized bed or an electrostatic fluidized bed. Preferably, electrostatic spraying is utilized in which a voltage of 20 to 100 kilovolts is applied to the gun. The composition is applied in several passed to a thickness of 0.5–6 mils, preferably 2–3 mils, and then baked at 150°–180°C. for 15–45 minutes.

Preferably, the novel coating composition of this invention is applied over a suitably treated and primed metal substrate or a primed and sealed metal substrate. Typical alkyd primers or epoxy primers pigmented with iron oxide, carbon black, titanium dioxide and the like can be used. Conventional epoxy sealers can also be used. The novel composition can be used directly over galvanized or phosphatized steel to form a durable coating. An electrically conductive carbon black pigment preferably is added to the primer or to the sealer to make the surface conductive and promote uniform deposition of the powder while spraying.

Electrodeposited primers can be used on the metal substrate. Typical electrodeposited primer compositions have as the film-forming constituents about 50–95 percent by weight of a carboxylic acid polymer having an acid number of 5–200 and correspondingly about 5–50 percent by weight of a cross-linking agent.

The following are examples of carboxylic polymers used in these primer compositions; maleinized drying oils which are the reaction products of maleic anhydride and a drying oil such as linseed oil, dehydrated castor oil, tung oil, soya bean oil and the like; alkyd resins which are the reaction products of a polyhydric alcohol and a polybasic acid such as, drying oil fatty acids; esterified epoxy resins such as, an epoxy-hydroxy polyether resin esterified with conventional drying oil fatty acid which can be further acidified with maleinized drying oils; acrylic polymers; polyesters; trimellitic anhydride alkyd resins; styrene/allyl alcohol copolymers reacted with a carboxylic acid constituent and the like.

The following are typical cross-linking agents used with the above carboxylic polymers to form conventional primers and primers that can be electrodeposited: melamine formaldehyde, alkylated melamine formaldehyde, urea formaldehyde, benzoguanamine formaldehyde, toluene sulfonamide resins; one preferred cross-linking agent is hexa(methoxymethyl)melamine. Other cross-linking agents such as, amines and other compatible hydroxyl terminated compounds can also be used.

The following Examples illustrate the invention. All quantities are on a weight basis unless otherwise indicated.

EXAMPLE 1

A hard acrylic polymer solution (A) is prepared as follows:

| PORTION 1 | GRAMS |
| --- | --- |
| Methyl methacrylate monomer | 697.0 |
| Lauryl methacrylate monomer | 26.0 |
| 2-Hydroxy ethyl acrylate monomer | 24.0 |
| 2-Hydroxy propyl methacrylate monomer | 38.0 |
| Methyl ethyl ketone | 117.0 |
| Toluene | 109.0 |
| 2-Mercaptoethanol | 14.8 |
| PORTION 2 | GRAMS |
| Azo-bis-isobutyronitrile | 0.5 |
| Methyl ethyl ketone | 20.0 |

Portions 1 and 2 are individually blended together. Portion 1 is charged into a polymerization vessel equipped with a thermometer, stirrer, reflux condenser, addition funnel, and a heating mantle; and the ingredients are heated to its reflux temperature; and then Portion 2 is added with stirring.

A monomer solution and a solvent/catalyst solution are prepared as follows:

| MONOMER SOLUTION | GRAMS |
| --- | --- |
| Methyl methacrylate monomer | 593.0 |
| Lauryl methacrylate polymer | 19.0 |
| 2-Hydroxy ethyl acrylate | 20.0 |
| 2-Hydroxy propyl methacrylate | 28.0 |
| TOTAL | 660.0 |
| SOLVENT/CATALYST SOLUTION | GRAMS |
| Methyl ethyl ketone | 148.0 |
| Toluene | 333.0 |
| Azo-bis-isobutyronitrile | 18.2 |
| TOTAL | 499.2 |

The above prepared monomer solution and solvent-/catalyst solutions are added to the reaction vessel over the following time periods while the reaction vessel is maintained during these addition periods at its reflux temperature. In each case, the monomer solution and the solvent/catalyst solution are premixed before addition to the reaction mixture. The following table shows the a time over which each of the additions of monomer and solvent/catalyst solution is made:

| TIME (MINUTES) | MONOMER SOLUTION (CUBIC CENTIMETERS) | SOLVENT/ CATALYST SOLUTION (CUBIC CENTIMETERS) |
| --- | --- | --- |
| 2.5– 15.0 | 225.0 | 120.0 |
| 15.0– 30.0 | 180.0 | 180.0 |
| 30.0– 60.0 | 150.0 | 220.0 |
| 60.0– 90.0 | 60.0 | 50.0 |
| 90.0–130.0 | 90.0 | 20.0 |
| 130.0–150.0 | 0.0 | 7.0 |

After the above ingredients are added, the reaction mixture is maintained at its reflux temperature for an additional 20 minutes and then diluted with at 760 grams of acetone. The resulting polymer solution has a solids content of 51.5 percent.

The polymer is a methyl methacrylate/lauryl methacrylate/hydroxy ethyl acrylate/hydroxy propyl methacrylate in a weight ratio of 89.5/3.1/3.0/4.4. The polymer has a number average molecular weight of 5,000 and a weight average molecular weight of about 11,000 determined by gel permeation chromatography using polymethyl methacrylate as the standard and a glass transition temperature of about 83°C. determined by scanning calorimetry.

A soft acrylic polymer solution (B) is prepared as follows:

| PORTION 1 | GRAMS |
| --- | --- |
| Methyl methacrylate monomer | 290.00 |
| Butyl acrylate monomer | 446.00 |
| 2-Hydroxy ethyl acrylate monomer | 34.00 |
| Methyl ethyl ketone | 270.00 |
| Lauryl mercaptan | 8.70 |
| PORTION 2 | |
| Azo-bis-isobutyronitrile | 0.28 |
| Methyl ethyl ketone | 20.00 |

Portions 1 and 2 are individually blended together. Portion 1 is charged into a polymerization vessel equipped with a thermometer, stirrer, reflux condenser, an addition funnel, and a heating mantle; and the ingredients are heated to about 98°C.; and then Portion 2 is added with stirring.

A monomer solution and a solvent/catalyst solution are prepared as follows:

| MONOMER SOLUTION | GRAMS |
| --- | --- |
| Methyl methacrylate monomer | 523.0 |
| Butyl acrylate monomer | 240.0 |
| 2-Hydroxy ethyl acrylate monomer | 61.0 |
| Lauryl mercaptan | 5.7 |
| TOTAL | 829.7 |
| SOLVENT/CATALYST | |
| Methyl ethyl ketone | 48.0 |
| Toluene | 201.0 |
| Azo-bis-isobutyronitrile | 11.1 |
| TOTAL | 260.1 |

The above prepared monomer solution and solvent-/catalyst solutions are added to the reaction vessel over the following time periods while the reaction mixture is held at about 95°–99°C. In each case, the monomer solution and the solvent/catalyst solution are premixed before addition to the reaction mixture. The following table shows the time over which each of the additions of monomer and solvent/catalyst solution is made:

| TIME (MINUTES) | MONOMER SOLUTION (CUBIC CENTIMETERS) | SOLVENT/ CATALYST SOLUTION (CUBIC CENTIMETERS) |
| --- | --- | --- |
| 2.5– 15.0 | 92 | 32 |
| 15.0– 30.0 | 110 | 36 |
| 30.0– 45.0 | 110 | 25 |
| 45.0– 60.0 | 110 | 20 |
| 60.0– 90.0 | 220 | 67 |
| 90.0–120.0 | Remaining Balance | 255 |
| 120.0–150.0 | — | 110 |
| 150.0–170.0 | Hold | |

After the above ingredients are added, the reaction mixture is maintained at about 92°C. for an additional 30 minutes and is then cooled and diluted with about 751 grams of acetone. The resulting polymer solution has about a 55 percent polymer solids content.

The polymer is methyl methacrylate/butyl acrylate/2-hydroxy ethyl acrylate in a weight ratio of about 51/43/6. The polymer has a number average molecular weight of about 17,000, a weight average molecular weight of about 36,000 measured by gel permeation chromotography using polymethyl methacrylate as the standard and a glass transition temperature of about 20°C. determined by scanning calorimetry.

A hard acrylic polymer solution C is prepared using the above preparation technique, except different acrylic monomers are used in different ratios. The resulting polymer solution C has a polymer solids content of 49 percent, and the polymer is methyl methacrylate/lauryl methacrylate/2-hydroxy propyl methacrylate in a weight ratio of 81/10/9. The polymer has a number average molecular weight of about 10,000, a weight average molecular weight of about 20,000 measured as above, and a glass transition temperature of about 73°C.

A mill base is prepared as follows:

|  | PARTS BY WEIGHT |
|---|---|
| Acrylic polymer solution A (prepared above) | 2,885.0 |
| Titanium dioxide pigment | 1,848.3 |
| Ferrite yellow-orange pigment (iron oxide pigment) | 1,151.7 |
| Toluene | 835.0 |
| Methyl ethyl ketone | 480.0 |
| TOTAL | 7,200.0 |

The above ingredients are premixed for about one hour and are charged into a conventional sand mill and are ground for 45 minutes to a 0.2 mil of fineness.

A blocked acid catalyst solution is then prepared as follows:

|  | PARTS BY WEIGHT |
|---|---|
| Paratoluene sulfonic acid | 4 |
| "Epon" 812 (epoxy resin of glyceryl glycidyl ether having the aforementioned formula) | 32 |
| Isopropanol | 64 |
| TOTAL | 100 |

The acid is added to the isopropanol, and then the epoxy resin is added with mixing while the constituents are at room temperature to form the blocked acid catalyst solution.

A liquid composition is then prepared:

|  | PARTS BY WEIGHT |
|---|---|
| Hard acrylic polymer solution A (prepared above) | 765.0 |
| Soft acrylic polymer solution B (prepared above) | 280.0 |
| Hard acrylic polymer solution C (prepared above) | 305.0 |
| "Cymel" 300 [(hexa (methoxy methyl)melamine] | 95.0 |
| Silicone anti-cratering agent (low-molecular-weight silicone oil) | 3.0 |
| Blocked acid catalyst solution (prepared above) | 27.5 |
| Dihydroxy functional plasticizer (hydroxyl terminated polycapralactone having a weight average molecular weight of 1250) | 110.0 |
| Didecyl phthalate | 15.0 |
| "Epon" 812 (described above) | 5.0 |
| Mill base (prepared above) | 344.0 |
| TOTAL | 1,949.5 |

The constituents are blended together and the composition is then charged into a W and P mixer and a vacuum of about 25–26 inches of mercury is applied, and the composition is held at about 80°C. for about 2½ hours with constant mixing to remove the solvents. The product is essentially free of solvent and is quenched with water and is taken from the mixer and is charged into a pin disc mill which reduces the particle size to about 75–150 microns. These particles are then charged into a "Vortec" fluid energy mill with about 0.2 percent by weight of "Cab-O-Sil" M-5 (finely divided silica powder) and ground into small-diameter particles, and the powder then is passed through a 200-mesh sieve (74 microns).

The resulting powder has two distinct glass transition temperatures of −17°C. and 35°C. indicating a polyblend structure. The powder is stable at room temperature and does not cake. The melt viscosity of the unpigmented powder is about $3.0 \times 10^3$ poises at 140°C.

The powder is charged into a holding tank of an electrostatic spray gun. A Model 322 Ransburg gun is used for application of the powder applying about 40 kilovolts. The powder is applied to phosphatized steel panels and to panels coated with a standard conductive alkyd resin primer and to panels coated with a conventional alkyd resin primer and a conductive sealer of an acrylic resin. A coating of powder is applied with the gun giving a coating about 2–3 mils thick. The panels are then baked for 20 minutes at 150°C. A final bake of 165°C. for 30 minutes is then given to the panels, giving a film about 1.7 to 3.5 mils thick.

The resulting panels have an excellent appearance and good physical properties. The panels have an acceptable cold crack resistance and humidity resistance, a knoop hardness of 12–14, a 20°C, gloss of 75–80, water spot resistance, and good exterior durability.

EXAMPLE 2

A green mill base is prepared as follows:

| PORTION 1 | PARTS BY WEIGHT |
|---|---|
| Organic dispersant solution (48% solids in a solvent blend of toluene methyl isobutyl ketone and methyl ethyl ketone of a dispersant of the formula | |

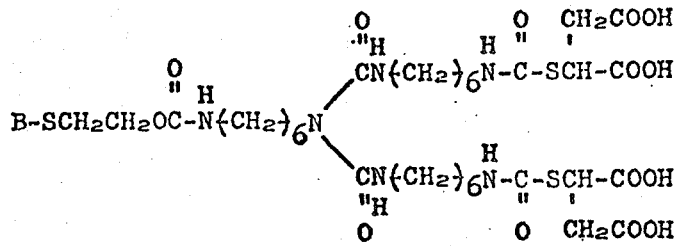

-Continued

| PORTION 1 | PARTS BY WEIGHT |
|---|---|
| where B is a MMA/2 EHA copolymeric segment having a number average molecular weight of 5,500 and a weight average molecular weight of 12,000) | 40.0 |
| Xylene | 12.0 |
| PORTION 2 | |
| Phthalo green-yellow pigment | 23.0 |
| PORTION 3 | |
| VM&P Naphtha | 25.0 |
| TOTAL | 100.0 |

Portion 1 is mixed for 15 minutes, and then Portion 2 is added and mixed for 30 minutes. Next, Portion 3 is added and mixed for 30 minutes, and the mixture is then charged into a conventional 8-gallon sand mill and ground 2 passes at a rate of 35 gallons per hour while maintaining the temperature at about 32°–44°C. to form a uniform pigment disposition.

A liquid composition is then prepared:

| | PARTS BY WEIGHT |
|---|---|
| Hard acrylic polymer solution A (prepared in Example 1) | 1,090.0 |
| Soft acrylic polymer solution B (prepared in Example 1) | 294.0 |
| Hard acrylic polymer solution C (prepared in Example 1) | 101.0 |
| "Cymel" 300 [(hexa (methoxy methyl) melamine] | 95.0 |
| Dihydroxy functional plasticizer (described in Example 1) | 115.0 |
| "Epon" 812 (described in Example 1) | 5.0 |
| Silicone anti-cratering agent | 3.0 |
| Blocked acid catalyst solution (described in Example 1) | 20.0 |
| Didecyl phthalate | 15.0 |
| Green mill base (prepared above) | 131.0 |
| TOTAL | 1,869.0 |

The above constituents are blended together and then charged into a W and P mixer and a vacuum of 25–26 inches of mercury is applied, and the composition is held at about 80°C. for about 2½ hours with constant mixing to remove the solvents. The powder is essentially free of solvents and is divided into two equal portions. One portion is blended with 0.15 percent "Cab-O-Sil" M–5 (finely divided silica) and ground in a pin disc mill and passed through a 270 mesh sieve and then is ground for a second time in the pin disc mill and passed through a 400 mesh sieve and then is dried for 24 hours under a vacuum.

The second portion of the powder is blended with about 0.15 percent of "Silanox" 101 (Silane treated silica powder) and is ground, sieved, and dried as above.

Each of the powders is stable at room temperature. The melt viscosity of the unpigmented powder is $2.5 \times 10^3$ poises at 140°C.

Each of the above powders is applied with an electrostatic spray gun, as in Example 1, to separate aluminum substrates and is baked, as in Example 1, to form a uniform, smooth, glossy finish having excellent physical properties.

EXAMPLE 3

A clear liquid composition is prepared as follows:

| | PARTS BY WEIGHT |
|---|---|
| Hard acrylic polymer solution A (prepared in Example 1) | 108.0 |
| Soft acrylic polymer solution B (prepared in Example 1) | 36.8 |
| "Cymel" 300 [hexa(methoxy methyl) melamine] | 9.5 |
| Dihydroxy functional plasticizer (described in Example 1) | 11.5 |
| Didecyl phthalate | 2.0 |
| Silicone anti-cratering agent | 0.3 |
| Methyl ethyl ketone | 22.2 |
| TOTAL | 190.3 |

The above ingredients are thoroughly blended together. 40 parts by weight of the above composition are blended with 0.5 parts by weight of the blocked acid catalyst solution prepared in Example 1. A powder is then prepared from the resulting composition, using the procedure described in Example 1 and blending about 0.15 percent by weight of "Cab-O-Sil" M–5 (finely divided silica) into the powder.

The powder is applied to a primed steel substrate by electrostatic deposition, as in Example 1, and is baked, as in Example 1, and gives a smooth, glossy, clear finish with excellent physical properties.

A mill base is prepared as follows:

| | PARTS BY WEIGHT |
|---|---|
| Soft acrylic polymer solution B (prepared in Example 1) | 3,000.0 |
| Titanium dioxide pigment | 1,848.3 |
| Ferrite yellow-orange pigment | 1,151.7 |
| Toluene | 720.0 |
| Methyl ethyl ketone | 480.0 |
| TOTAL | 7,200.0 |

The above ingredients are thoroughly blended together and then ground 2 passes in a conventional sand mill.

A pigmented liquid composition is prepared as follows:

| | PARTS BY WEIGHT |
|---|---|
| Hard acrylic polymer solution A (prepared in Example 1) | 96.0 |
| Soft acrylic polymer solution B | 36.8 |
| "Cymel" 300 [hexa(methoxy methyl) melamine] | 9.5 |
| Dihydroxy functional plasticizer (described in Example 1) | 11.5 |
| Didecyl phthalate | 2.0 |
| Silicone anti-cratering agent | 0.3 |
| Mill base (prepared above) | 30.4 |
| Methyl ethyl ketone | 13.5 |
| TOTAL | 200.0 |

The above ingredients are thoroughly blended together. 40 parts by weight of the above composition are blended with 0.5 parts by weight of the blocked acid catalyst solution prepared in Example 1. A powder is then prepared from the resulting composition using the procedure described in Example 1 and by blending about 0.15 percent by weight of "Cab-O-Sil" M-5 (finely divided silica) into the powder.

The powder is applied to a primed steel substrate by electrostatic deposition, as in Example 1, and is baked, as in Example 1. The resulting finish is about 2.5 mils thick, has a 20°C. gloss of 76, and excellent appearance, good humidity resistance, a hardness of 11 knoops, and good outdoor durability.

The invention claimed is:

1. A thermosetting acrylic polymer powder coating composition comprising finely divided particles having a particle size of 1–100 microns; wherein the powder particles are an intimately mixed blend of film-forming constituents consisting essentially of
   A. 40–75 percent by weight of a hard acrylic polymer consisting essentially of
      1. 80–95 percent by weight, based on the weight of the hard acrylic polymer, of methyl methacrylate,
      2. 3–10 percent by weight, based on the weight of the hard acrylic polymer, of an alkyl methacrylate or an alkyl acrylate having 2–14 carbon atoms in the alkyl groups,
      3. 2–17 percent by weight, based on the weight of the hard acrylic polymer, of a hydroxyalkyl acrylate or hydroxyalkyl methacrylate having 2–4 carbon atoms in the alkyl groups or mixtures thereof;
   wherein the hard acrylic polymer has a glass transition temperature of about 75° to 90°C. and a number average molecular weight of 3,000–10,000;
   B. 10–25 percent by weight of a soft acrylic polymer consisting essentially of
      1. 40–60 percent by weight, based on the weight of the soft acrylic polymer, of methylmethacrylate,
      2. 30–56 percent by weight, based on the weight of the soft acrylic polymer, of an alkyl acrylate or an alkyl methacrylate having 2–14 carbon atoms in the alkyl groups,
      3. 4–10 percent by weight, based on the weight of the soft acrylic polymer, of a hydroxy alkyl acrylate or a hydroxy alkyl methacrylate having 2–4 carbon atoms in the alkyl groups or mixtures thereof;
   wherein the soft acrylic polymer has a glass transition temperature of about 0° to 30°C. and a number average molecular weight of about 8,000–20,000;
   C. 7–19.98 percent by weight of an alkylated melamine formaldehyde resin having 1–8 carbon atoms in the alkyl group;
   D. 6–15 percent by weight of dihydroxy functional plasticizer of a polyester resin having a molecular weight of 520–4,000 or a polycaprolactone having a molecular weight of 520–2,000; and
   E. 0.02–2.0 percent by weight of a blocked acid catalyst of a blocked paratoluene sulfonic acid catalyst.

2. The powder coating composition of claim 1 containing about 0.2–50 percent by weight of pigment.

3. The coating composition of claim 2 in which the hard acrylic polymer has a number average molecular weight of about 4,000–7,000 and consists essentially of 85–90 percent by weight of methyl methacrylate, 2–5 percent by weight of lauryl methacrylate and 2–4 percent by weight of hydroxyethyl acrylate and 3–6 percent by weight of hydroxy propyl methacrylate.

4. The powder coating composition of claim 2 in which the soft acrylic polymer has a number average molecular weight of 9,000–17,000 and consists essentially of 45–55 percent by weight of methyl methacrylate, 40–45 percent by weight of butyl acrylate and 5–10 percent by weight of hydroxyethyl acrylate.

5. The powder coating composition of claim 2 in which the alkylated melamine formaldehyde resin is hexa(methoxymethyl) melamine.

6. The powder coating composition of claim 2 in which the paratoluene sulfonic acid catalyst is blocked with a low molecular weight of epoxy resin of the formula $$H_2C \underset{H}{\overset{O}{\diagup\!\!\!\diagdown}} C - CH_2 - O - CH_2 - \underset{\underset{CH_2}{\overset{|}{O}}}{\overset{H}{\underset{|}{C}}} - CH_2 - O - CH_2 - \underset{H}{\overset{O}{\diagup\!\!\!\diagdown}} C - CH_2$$

$$H - C \overset{\diagdown}{\underset{H_2C \diagup}{O}}$$

7. The powder coating composition of claim 2 in which the dihydroxy functional plasticizer is a polyester resin having a molecular weight of 520–4,000.

8. The powder coating composition of claim 6 in which the dihydroxy functional plasticizer is a hydroxy terminated polycaprolactone having a molecular weight of 520–2,000.

9. The thermosetting acrylic polymer powder coating composition of claim 2 comprising finely divided particles having a particle size of 10–75 microns; wherein the powder particles are an intimately mixed blend of film-forming constitutents consisting essentially of A. 55–65 percent by weight of a hard acrylic polymer consisting essentially of
1. 85–90 percent by weight of methyl methacrylate,
2. 2–5 percent by weight of lauryl methacrylate,
3. 2–4 percent by weight of hydroxy ethyl acrylate,
4. 3–6 percent by weight of hydroxy propyl methacrylate;

wherein the acrylic polymer has a number average molecular weight of about 4,000–7,000;

B. 12–18 percent by weight of a soft acrylic polymer consisting essentially of 45–55 percent by weight of methyl methacrylate, 40–45 percent by weight of butyl acrylate and 5–10 percent by weight of hydroxyethyl acrylate and has a number average molecular weight of about 9,000–17,000;

C. 7–14 percent by weight of hexa(methoxymethyl)melamine;

D. 8–12 percent by weight of dihydroxy functional plasticizer of a polyester resin having a molecular weight of 520–4,000 or a polycaprolactone resin having molecular weight of 520–2,000; and E. 0.02–1.0 percent by weight of paratoluene sulfonic acid catalyst blocked with a low molecular weight epoxy resin of the formula

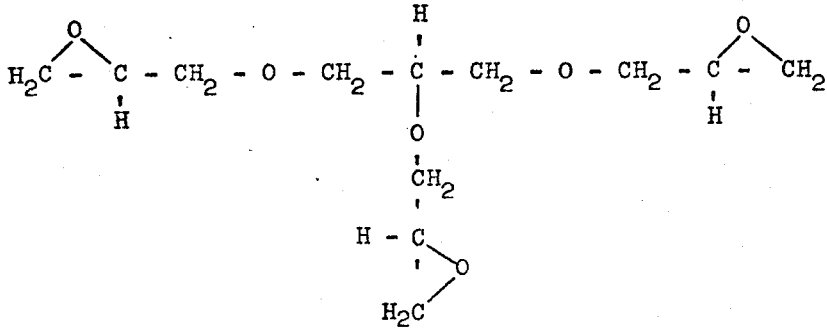

10. A metal substrate coated with a smooth, even coalesced layer of the powder coating composition of claim 1.

* * * * *